(No Model.)

S. B. BURWELL.
ATTACHMENT FOR FIRE PLACES.

No. 333,921. Patented Jan. 5, 1886.

ATTEST
Joseph Littell
E. D. Williams

INVENTOR
Stephen B. Burwell,
by John E. Jones,
his Attorney

UNITED STATES PATENT OFFICE.

STEPHEN B. BURWELL, OF CINCINNATI, OHIO.

ATTACHMENT FOR FIRE-PLACES.

SPECIFICATION forming part of Letters Patent No. 333,921, dated January 5, 1886.

Application filed January 17, 1885. Serial No. 153,209. (No model.)

*To all whom it may concern:*

Be it known that I, STEPHEN B. BURWELL, a citizen of the United States, residing at Cincinnati, in the county of Hamilton and State of Ohio, have invented a certain new and useful Improvement in Attachments for Fire-Places, of which the following is a specification.

My invention relates to an improvement in fire-place attachments, or, more particularly speaking, to a blower and reflector for house-grates.

It has for its object, first, to provide, in connection with the opening above the grate-basket, a series of leaves or plates pivoted at their ends to the side walls or facing of the fire-place, and adapted to be expanded or opened out to form a blower over the said opening, and folded upwardly toward the top of the said opening, so as to project outwardly therefrom sufficient to come partially within the path of the heat and smoke to form a reflector of the heat, and a means to guide the smoke into the chimney.

Another object of my invention is to provide, in connection with the inner or lowermost one of the said leaves or plates composing the device in its folded position, a sliding damper-plate which is so arranged as to partially or wholly close up the throat of the fire-place leading to the flue, as desired, thereby permitting the closing off of the draft when the blower is down at night for safety purposes, as hereinafter described.

Figure 1:
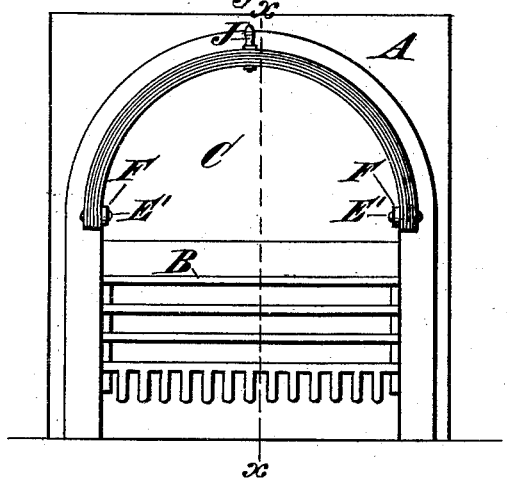
Figure 2:
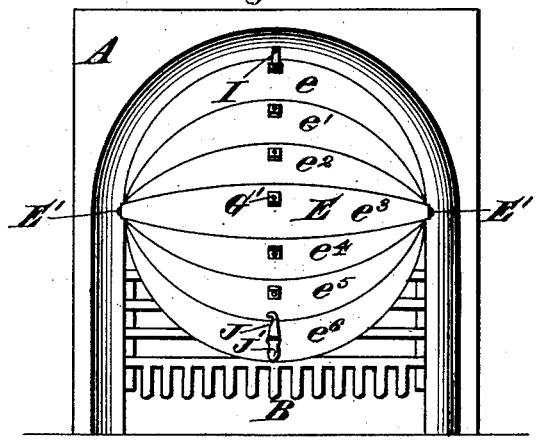
Figure 3:
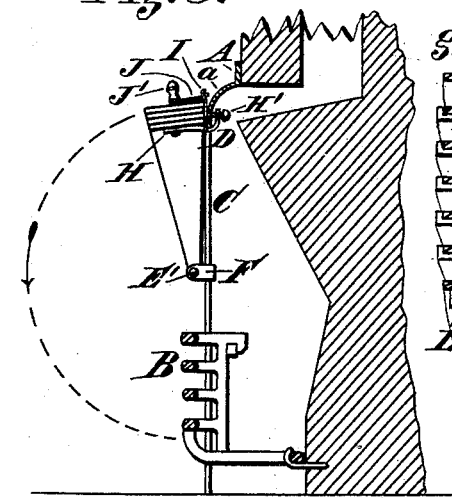
Figure 4:
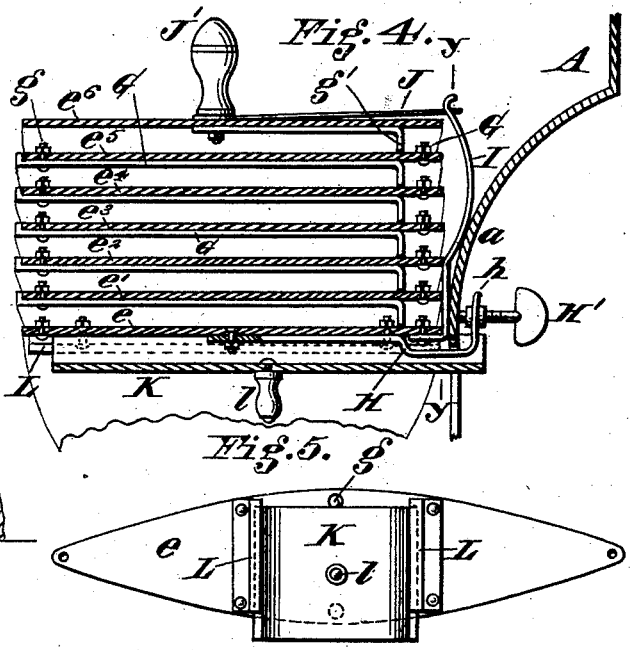
Figure 5:
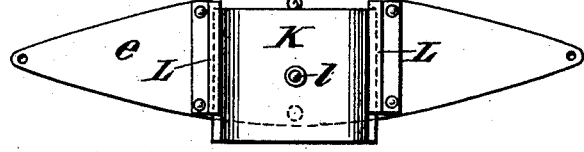
Figure 6:
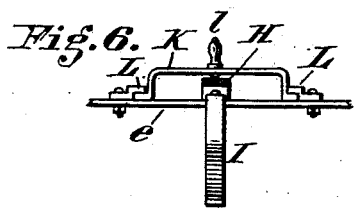
Figure 7:
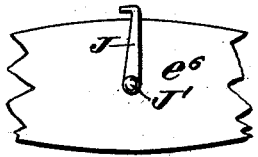
Figure 9:
Figure 8:
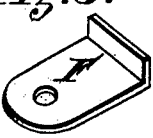

In the accompanying drawings, Figure 1 is a front elevation of a fire-place with my device applied thereto, showing it folded up and serving as a smoke-preventer and heat-reflector. Fig. 2 is a similar view with the device unfolded or expanded in position over the fire-place opening to serve as a blower or a safeguard to prevent the accidental falling of ignited coals or sparks on the floor in front of the grate. Fig. 3 is a transverse sectional elevation on line $x$ $x$, Fig. 1, showing the device folded back in the reflector position, the dotted line and arrow indicating the path of the leaves or plates in falling into position to form a complete blower. Fig. 4 is an enlarged transverse section of the center of the plates of the device and the arched center of the fire-place facing, showing the manner in which the device is attached in place, and also showing a sectional elevation of the damper combined therewith. Fig. 5 is an under side plan view of the inner or lowermost plate of the device with the sliding damper in place thereon. Fig. 6 is a broken sectional elevation on line $y$ $y$, Fig. 4, of the rear of the damper, inner plate and attaching-hooks being shown inverted. Fig. 7 is a broken plan view of the upper plate of the series, showing the hook or latch thereon for holding the leaves composing the device in their folded position. Fig. 8 is a detail perspective view of one of the lugs or brackets to which the ends of the plates are pivoted. Fig. 9 is a detail perspective view of one of the stop-bars, which are secured in place intermediate the plates to act in co-operation with short bolts, and their fastening-nuts on said plates to support the parts of the device in their expanded or blower position.

A represents the facing or grate-frame, and B the grate-basket set as customary therein.

C represents the arched opening in the frame above the grate-basket, and D the throat or mouth of the flue.

E represents a blower covering the opening C, as shown in Fig. 2. Blower E is composed of a series of leaves or plates, $e\ e'\ e^2\ e^3\ e^4\ e^5\ e^6$, which are preferably of elliptical form, and are arranged so that their opposite ends meet at common centers and pivot on studs or bolts E', passed through holes in lugs or brackets F at the sides of the opening C.

G represents stop-bars secured by bolts $g$ to one of the faces of said leaves or plates, and arranged intermediate the plates, so that the upturned ends $g'$ abut the bolts $g$, in order to unfold the leaves and sustain them when unfolded or expanded.

G' represents bolts in said plates, set about midway between the ends thereof and in the sides opposite the bolts $g$, to serve as stops for the bars G in folding the plates in the position shown in Figs. 1, 3, and 4.

H represents a bent plate secured to the leaf $e$, as shown in Fig. 4, and H' is a set-screw in the upturned end $h$ of plate H, to adjustably and firmly secure the said plate $e$ in place in the arched portion $a$ of the facing A.

I represents a spring secured at one of its ends to the plate $e$, and projecting upwardly slightly beyond plate $e^6$, for engagement with catch hook or latch J on said plate $e^6$, to support the leaves in their upward folded condition against the facing.

J′ represents a handle on plate $e^6$ for opening or closing the device. Latch J is preferably connected with the handle J′, so that it can be readily turned into or out of engagement with spring-catch I.

K represents a damper sliding in ways L on the lower face of plate e. l represents a manipulating-handle on damper-plate K.

In the operation of my device, the leaves composing it are folded up and held in place by the spring-catch over the grate-opening, so as to reflect the rising heat, and at the same time serve to guide the smoke into the flue, thus preventing its escape as much as possible into the room.

To form a blower of the device, the spring-catch is disengaged and the leaves brought down by the handle J′ over the said opening to cover it, and bringing the leaf $e^6$ adjacent the lower end of the grate-basket, as shown in Fig. 2.

To form a safeguard over the fire to prevent ignited coals and sparks falling on the floor from the grate, the device is brought down in the blower position after the damper above has been first set to shut off the draft.

I claim—

1. In a grate attachment, the combination, with the pivoted leaves or plates $e\ e'\ e^2\ e^3\ e^4\ e^5\ e^6$, of the spring-catch device I J J′ and the attaching hook or plate H H′, substantially as herein set forth.

2. In a grate attachment, the combination, with the leaf e, provided with ways, and leaves or plates $e'\ e^2\ e^3\ e^4\ e^5$, of a sliding damper-plate, K, mounted in the ways of plate e, substantially as and for the purpose set forth.

In testimony of which invention I have hereunto set my hand.

STEPHEN B. BURWELL.

Witnesses:
JOHN E. JONES,
PHILIP RILL.